(12) United States Patent
West et al.

(10) Patent No.: US 9,478,858 B1
(45) Date of Patent: Oct. 25, 2016

(54) MULTI-CHIP MODULE ARCHITECTURE

(71) Applicants: James B. West, Cedar Rapids, IA (US); Lee M. Paulsen, Cedar Rapids, IA (US); Daniel L. Woodell, Holts Summit, MO (US); Michael L. Hageman, Mount Vernon, IA (US); Russell D. Wyse, Center Point, IA (US); Adrian Hill, Vinton, IA (US)

(72) Inventors: James B. West, Cedar Rapids, IA (US); Lee M. Paulsen, Cedar Rapids, IA (US); Daniel L. Woodell, Holts Summit, MO (US); Michael L. Hageman, Mount Vernon, IA (US); Russell D. Wyse, Center Point, IA (US); Adrian Hill, Vinton, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 756 days.

(21) Appl. No.: 13/837,934

(22) Filed: Mar. 15, 2013

(51) Int. Cl.
*H01Q 3/00* (2006.01)
*H01Q 3/34* (2006.01)

(52) U.S. Cl.
CPC ..................................... *H01Q 3/34* (2013.01)

(58) Field of Classification Search
CPC ....... G01S 7/03; H01L 23/66; H01Q 1/2283; H01Q 3/00
USPC .................................................... 342/372, 70
See application file for complete search history.

(56) References Cited

U.S. PATENT DOCUMENTS

| | | | |
|---|---|---|---|
| 650,275 A | 5/1900 | Reeve | |
| 3,251,057 A | 5/1966 | Buehler et al. | |
| 3,359,557 A | 12/1967 | Fow et al. | |
| 3,404,396 A | 10/1968 | Buchler et al. | |
| 3,465,339 A | 9/1969 | Marner | |
| 3,491,358 A | 1/1970 | Hicks | |
| 3,508,259 A | 4/1970 | Andrews | |
| 3,540,829 A | 11/1970 | Collinson et al. | |
| 3,567,915 A | 3/1971 | Altshuler et al. | |
| 3,646,555 A | 2/1972 | Atlas | |

(Continued)

FOREIGN PATENT DOCUMENTS

| | | |
|---|---|---|
| EP | 1 329 738 B1 | 7/2003 |
| FR | 2658617 A1 | 8/1991 |

(Continued)

OTHER PUBLICATIONS

Non-Final Office Action on U.S. Appl. No. 14/549,142 Dated Apr. 1, 2015, 8 pages.

(Continued)

*Primary Examiner* — Harry Liu
(74) *Attorney, Agent, or Firm* — Donna P. Suchy; Daniel M. Barbieri (57) ABSTRACT

Electronically scanned arrays and multi-chip modules (MCMs) that may be used in such arrays are provided. One MCM may include a set of one or more first semiconductor components and a plurality of second semiconductor components. The first semiconductor component set is coupled to the plurality of second semiconductor components, and the first semiconductor component set is configured to control the plurality of second semiconductor components. Each of the plurality of second semiconductor components is accessible through a plurality of data strings providing communication between the first semiconductor component set and the plurality of second semiconductor components, each data string defining a unique path between the first semiconductor component set and the plurality of second semiconductor components, such that the plurality of data strings provide redundant data paths between the first semiconductor component set and the plurality of second semiconductor components.

32 Claims, 7 Drawing Sheets

(56) References Cited

U.S. PATENT DOCUMENTS

| | | |
|---|---|---|
| 3,715,748 A | 2/1973 | Hicks |
| 3,764,719 A | 10/1973 | Dell |
| 3,781,530 A | 12/1973 | Britland et al. |
| 3,781,878 A | 12/1973 | Kirkpatrick |
| 3,803,609 A | 4/1974 | Lewis et al. |
| 3,885,237 A | 5/1975 | Kirkpatrick |
| 3,943,511 A | 3/1976 | Evans et al. |
| 3,964,064 A | 6/1976 | Brandao et al. |
| 3,968,490 A | 7/1976 | Gostin |
| 4,015,257 A | 3/1977 | Fetter |
| 4,043,194 A | 8/1977 | Tanner |
| 4,223,309 A | 9/1980 | Payne |
| 4,283,715 A | 8/1981 | Choisnet |
| 4,283,725 A | 8/1981 | Chisholm |
| 4,318,100 A | 3/1982 | Shimizu et al. |
| 4,346,595 A | 8/1982 | Frosch et al. |
| 4,430,654 A | 2/1984 | Kupfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,028,929 A | 7/1991 | Sand et al. |
| 5,036,334 A | 7/1991 | Henderson et al. |
| 5,049,886 A | 9/1991 | Seitz et al. |
| 5,059,967 A | 10/1991 | Roos |
| 5,077,558 A | 12/1991 | Kuntman |
| 5,111,400 A | 5/1992 | Yoder |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor et al. |
| 5,198,819 A | 3/1993 | Susnjara |
| 5,202,690 A | 4/1993 | Frederick |
| 5,208,600 A | 5/1993 | Rubin |
| 5,262,773 A | 11/1993 | Gordon |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,469,168 A | 11/1995 | Anderson |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A | 12/1996 | Miller |
| 5,592,171 A | 1/1997 | Jordan |
| 5,602,543 A | 2/1997 | Prata et al. |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,839,080 A | 11/1998 | Muller et al. |
| 5,907,568 A | 5/1999 | Reitan, Jr. |
| 5,920,276 A | 7/1999 | Frederick |
| 5,945,926 A | 8/1999 | Ammar et al. |
| 5,973,635 A | 10/1999 | Albo |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,246,367 B1 | 6/2001 | Markson et al. |
| 6,289,277 B1 | 9/2001 | Feyereisen et al. |
| 6,297,772 B1 | 10/2001 | Lewis |
| 6,308,122 B1 | 10/2001 | Nishizaki et al. |
| 6,340,946 B1 | 1/2002 | Wolfson et al. |
| 6,381,538 B1 | 4/2002 | Robinson et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,456,226 B1 | 9/2002 | Zheng et al. |
| 6,480,142 B1 | 11/2002 | Rubin |
| 6,489,915 B1 | 12/2002 | Lines et al. |
| 6,496,252 B1 | 12/2002 | Whiteley |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 | 11/2003 | Robinson et al. |
| 6,667,710 B2 | 12/2003 | Cornell et al. |
| 6,670,908 B2 | 12/2003 | Wilson et al. |
| 6,677,886 B1 | 1/2004 | Lok |
| 6,683,609 B1 | 1/2004 | Baron et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,042,387 B2 | 5/2006 | Ridenour et al. |
| 7,082,382 B1 | 7/2006 | Rose et al. |
| 7,109,912 B1 | 9/2006 | Paramore et al. |
| 7,109,913 B1 | 9/2006 | Paramore et al. |
| 7,116,266 B1 | 10/2006 | Vesel et al. |
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 | 1/2007 | Finley et al. |
| 7,200,491 B1 | 4/2007 | Rose et al. |
| 7,242,343 B1 | 7/2007 | Woodell |
| 7,259,714 B1 | 8/2007 | Cataldo |
| 7,292,178 B1 | 11/2007 | Woodell et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,307,756 B2 | 12/2007 | Walmsley |
| 7,352,317 B1 | 4/2008 | Finley et al. |

(56) References Cited

U.S. PATENT DOCUMENTS

| | | | |
|---|---|---|---|
| 7,352,929 | B2 | 4/2008 | Hagen et al. |
| 7,372,394 | B1 | 5/2008 | Woodell et al. |
| 7,383,131 | B1 | 6/2008 | Wey et al. |
| 7,417,579 | B1 | 8/2008 | Woodell |
| 7,486,219 | B1 | 2/2009 | Woodell et al. |
| 7,486,220 | B1 | 2/2009 | Kronfeld et al. |
| 7,492,304 | B1 | 2/2009 | Woodell et al. |
| 7,492,305 | B1 | 2/2009 | Woodell et al. |
| 7,515,087 | B1 | 4/2009 | Woodell et al. |
| 7,515,088 | B1 | 4/2009 | Woodell et al. |
| 7,528,613 | B1 | 5/2009 | Thompson et al. |
| 7,541,971 | B1 | 6/2009 | Woodell et al. |
| 7,598,901 | B2 | 10/2009 | Tillotson et al. |
| 7,598,902 | B1 | 10/2009 | Woodell et al. |
| 7,609,200 | B1 | 10/2009 | Woodell et al. |
| 7,616,150 | B1 | 11/2009 | Woodell |
| 7,633,431 | B1 | 12/2009 | Wey et al. |
| 7,639,175 | B1 | 12/2009 | Woodell |
| 7,696,921 | B1 | 4/2010 | Finley et al. |
| 7,714,767 | B1 | 5/2010 | Kronfeld et al. |
| 7,843,380 | B1 | 11/2010 | Woodell |
| 7,859,448 | B1 | 12/2010 | Woodell et al. |
| 7,859,449 | B1 | 12/2010 | Woodell et al. |
| 7,889,117 | B1 | 2/2011 | Woodell et al. |
| 7,917,255 | B1 | 3/2011 | Finley |
| 7,973,698 | B1 | 7/2011 | Woodell et al. |
| 8,072,368 | B1 | 12/2011 | Woodell |
| 8,248,274 | B2 | 8/2012 | Christophe et al. |
| 8,515,600 | B1 | 8/2013 | McCusker |
| 8,902,100 | B1 | 12/2014 | Woodell et al. |
| 8,907,817 | B1 | 12/2014 | Finley et al. |
| 2003/0001770 | A1 | 1/2003 | Cornell et al. |
| 2003/0016156 | A1 | 1/2003 | Szeto et al. |
| 2005/0049789 | A1 | 3/2005 | Kelly et al. |
| 2006/0036366 | A1 | 2/2006 | Kelly et al. |
| 2007/0018974 | A1 | 1/2007 | Fujiwara et al. |
| 2009/0251356 | A1* | 10/2009 | Margomenos ............ G01S 7/03 342/70 |
| 2010/0327068 | A1* | 12/2010 | Chen ................ G06K 19/07749 235/492 |
| 2013/0207274 | A1* | 8/2013 | Liu .......................... H01L 23/66 257/774 |
| 2014/0145883 | A1* | 5/2014 | Baks ..................... H01Q 1/2283 343/700 MS |

FOREIGN PATENT DOCUMENTS

| | | |
|---|---|---|
| WO | WO-98/07047 A1 | 2/1998 |
| WO | WO-98/22834 A1 | 5/1998 |
| WO | WO-03/005060 A1 | 1/2003 |
| WO | WO-2009/137158 | 11/2009 |

OTHER PUBLICATIONS

Advisory Action dated Jun. 24, 2010 for U.S. Appl. No. 10/978,680 (3 pages).
Advisory Action for U.S. Appl. No. 12/075,103, mail date Nov. 8, 2010, 3 pages.
Advisory Action for U.S. Appl. No. 12/075,103, mail date Oct. 15, 2010, 3 pages.
Bovith et al., Detecting Weather Radar Clutter by Information Fusion with Satellite Images and Numerical Weather Prediction Model Output; Jul. 31-Aug. 4, 2006, 4 pages.
Burnham et al., Thunderstorm Turbulence and Its Relationship to Weather Radar Echoes, J. Aircraft, Sep.-Oct. 1969, 8 pages.
Corridor Integrated Weather System (CIWS), www.ll.mit.edu/mission/aviation/faawxsystems/ciws.html, received on Aug. 19, 2009, 3 pages.
Doviak et al., Doppler Radar and Weather Observations, 1984, 298 pages.
Dupree et al.,FAA Tactical Weather Forecasting in the United States National Airspace, 29 pages.
Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.
Hodanish, Integration of Lightning Detection Systems in a Modernized National Weather Service Office, http://www.srh.noaa.gov/mlb/hoepub.html, retrieved on Aug. 6, 2007, 5 pages.
Keith, Transport Category Airplane Electronic Display Systems, Jul. 16, 1987, 34 pages.
U.S. Appl. No. 12/075,103, filed Mar. 7, 2008, Woodell et al.
Klingle-Wilson et al., Description of Corridor Integrated Weather System (CIWS) Weather Products, Aug. 1, 2005, 120 pages.
Meteorological/KSC/L71557/Lighting Detection and Ranging (LDAR), Jan. 2002, 12 pages.
Notice of Allowance for U.S. Appl. No. 10/631,253, mail date Jul. 28, 2005, 7 pages.
Notice of Allowance for U.S. Appl. No. 11/256,845, mail date May 27, 2009, 7 pages.
Notice of Allowance for U.S. Appl. No. 11/370,085, mail date Dec. 30, 2008, 6 pages.
Notice of Allowance for U.S. Appl. No. 11/402,434, mail date Nov. 4, 2008, 6 pages.
Notice of Allowance for U.S. Appl. No. 11/515,642, mail date Jun. 24, 2010, 6 pages.
Notice of Allowance for U.S. Appl. No. 12/360,651, mail date Sep. 23, 2011, 6 pages.
Notice of Allowance for U.S. Appl. No. 12/405,091, mail date Mar. 19, 2012, 8 pages.
Office Action for U.S. Appl. No. 11/256,845, mail date Aug. 21, 2007, 4 pages.
Office Action for U.S. Appl. No. 10/631,253, mail date Jan. 14, 2004, 5 pages.
Office Action for U.S. Appl. No. 10/631,253, mail date Jun. 30, 2004, 4 pages.
Office Action for U.S. Appl. No. 11/256,845, mail date Dec. 5, 2006, 5 pages.
Office Action for U.S. Appl. No. 11/256,845, mail date Jul. 28, 2008, 5 pages.
Office Action for U.S. Appl. No. 11/256,845, mail date Jun. 22, 2006, 5 pages.
Office Action for U.S. Appl. No. 11/370,085, mail date Aug. 15, 2007, 10 pages.
Office Action for U.S. Appl. No. 11/370,085, mail date Dec. 4, 2007, 13 pages.
Office Action for U.S. Appl. No. 11/370,085, mail date Oct. 9, 2008, 5 pages.
Office Action for U.S. Appl. No. 11/402,434, mail date Jul. 17, 2008, 5 pages.
Office Action for U.S. Appl. No. 11/402,434, mail date Mar. 29, 2007, 8 pages.
Office Action for U.S. Appl. No. 11/402,434, mail date Oct. 26, 2006, 7 pages.
Office Action for U.S. Appl. No. 11/402,434, mail date Sep. 20, 2007, 7 pages.
Office Action for U.S. Appl. No. 11/515,642, mail date Dec. 22, 2008, 5 pages.
Office Action for U.S. Appl. No. 11/515,642, mail date Feb. 12, 2008, 7 pages.
Office Action for U.S. Appl. No. 11/515,642, mail date Jan. 5, 2010, 5 pages.
Office Action for U.S. Appl. No. 12/075,103, mail date Feb. 26, 2010, 11 pages.
Office Action for U.S. Appl. No. 12/075,103, mail date Jul. 29, 2010, 7 pages.
Office Action for U.S. Appl. No. 12/075,103, mail date Jun. 20, 2012, 5 pages.
Office Action for U.S. Appl. No. 12/075,103, mail date Nov. 29, 2012, 6 pages.
Office Action for U.S. Appl. No. 12/405,091, mail date Aug. 18, 2011, 7 pages.
Office Action for U.S. Appl. No. 12/405,091, mail date Feb. 25, 2011, 6 pages.
Office Action on U.S. Appl. No. 13/760,964 Dated Apr. 23, 2014, 7 pages.

(56) References Cited

OTHER PUBLICATIONS

Pessi et al., On the Relationship Between Lightning and Convective Rainfall Over the Central Pacific Ocean, date unknown, 9 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, 10 pages.
Zipser et al., The Vertical Profile of Radar Reflectivity and Convective Cells: A Strong Indicator of Storm Intensity and Lightning Probability? America Meteorological Society, 1994, 9 pages.
Action Closing Prosecution (37 CFR 1.949) in Inter Parties Reexamination of U.S. Pat. No. 7,161,525, control No. 95/001,860, mail date Nov. 15, 2012, 62 pages.
Decision on Appeal for Inter Parties Reexamination Control No. 95/001,860, dated Oct. 17, 2014, 17 pages.
Examiner's Answer to Appeal Brief in Inter Parties Reexamination of U.S. Pat. No. 7,161,525, control No. 95/001,860, mail date Aug. 20, 2013, 3 pages.
Exhibits Filed by Third Party in Inter Parties Reexamination of U.S. Pat. No. 7,161,525, control No. 95/001,860, filed May 30, 2012, 7 pages.
Honeywell, RDR-4B Forward Looking Windshear Detection/Weather Radar System User'S Manual With Radar Operation Guidelines (Rev. 6) Jul. 2003, 106 pages.
Kuntman et al., Turbulence Detection and Avoidance System, International Air Safety Seminar, Oct. 29, 2000, 13 pages.
Kuntman, Daryal, "Airborne System to Address Leading Cause of Injuries in Non-Fatal Airline Accidents," ICAO Journal, vol. 5, No. 2, Mar. 2000, 4 pages.
Nathanson, Fred E., "Radar and Its Composite Environment," Radar Design Principles, Signal Processing and the Environment, 1969, 5 pages, McGraw-Hill Book Company, New York et al.
Non-Final Office Action in Inter Parties Reexamination of U.S. Pat. No. 7,161,525, control No. 95/001,860, mail date Mar. 2, 2012, 28 pages.
Notice of Allowance on U.S. Appl. No. 11/323,196 mailed on Apr. 19, 2010.
Notice of Appeal to the Patent Trial and Appeal Board in Inter Parties Reexamination of U.S. Pat. No. 7,161,525, control No. 95/001,860, dated Mar. 4, 2013, 2 pages.
Order Granting Request for Inter Parties Reexamination in Inter Parties Reexamination of U.S. Pat. No. 7,161,525, control No. 95/001,860, mail date Mar. 2, 2012, 21 pages.
Original Request for Inter Parties Reexamination of U.S. Pat. No. 7,161,525 filed by Honeywell International Inc., and supporting exhibits in Inter Parties Reexamination of U.S. Pat. No. 7,161,525, control No. 95/001,860, filed Dec. 21, 2011.
Patent Owner's Response to Board Decision in Inter Parties Reexamination of U.S. Pat. No. 7,161,525, control No. 95/001,860 including Exhibits A, B, and C, filed Nov. 17, 2014, 65 pages.
Patent Owner's Response to Office Action in Inter Parties Reexamination of U.S. Pat. No. 7,161,525, control No. 95/001,860 filed May 1, 2012, 57 pages.
Respondent's Brief in Inter Parties Reexamination of U.S. Pat. No. 7,161,525, control No. 95/001,860, filed Jun. 21, 2013, 29 pages.
Right of Appeal Notice in Inter Parties Reexamination of U.S. Pat. No. 7,161,525, control No. 95/001,860, mail date Feb. 22, 2013, 63 pages.
Third Party Requester Comments submitted by Honeywell International Inc. in Inter Parties Reexamination of U.S. Pat. No. 7,161,525, control No. 95/001,860, 34 pages.
Third Party Requester's Brief on Appeal in Inter Parties Reexamination of U.S. Pat. No. 7,161,525, control No. 95/001,860, filed May 22, 2013, 46 pages.
Third Party Requester's Rebuttal Brief in Inter Parties Reexamination of U.S. Pat. No. 7,161,525, control No. 95/001,860, filed Sep. 20, 2013, 21 pages.
Dupree et al.,FAA Tactical Weather Forecasting in the United States National Airspace, Proceedings from the World Weather Research Symposium on Nowcasting and Very Short Term Forecasts, Toulouse, France, 2005, 29 pages.
Ex-Parte Quayle Action Received in U.S. Appl. No. 13/781,449, dated Dec. 24, 2014, 6 pages.
Wilson et al., The Complementary Use of Titan-Derived Radar and Total Lightning Thunderstorm Cells, paper presented on Oct. 16, 2005, 10 pages.
U.S. Appl. No. 11/851,323, filed Sep. 6, 2007, McCusker.
U.S. Appl. No. 13/183,314, filed Jul. 14, 2011, Sishtla et al.
U.S. Appl. No. 13/781,449, filed Feb. 28, 2013, West et al.
AN/APG Active Electronically Scanned Array AESA, www.globalsecurity.org/military/systems/aircraft/systems/an-apg-aesa.htm, retrieved on Feb. 26, 2013, 6 pages.
Final Office Action on U.S. Appl. No. 14/549,142 dated Jul. 13, 2015, 8 pages.
Non-Final Office Action on U.S. Appl. No. 14/549,142 dated Mar. 22, 2016, 7 pages.

\* cited by examiner

MULTI-CHIP MODULE ARCHITECTURE

CROSS-REFERENCE TO RELATED PATENT APPLICATIONS

This application is related to U.S. application Ser. No. 13/781,449, filed Feb. 28, 2013, and titled "SYSTEM FOR AND METHOD OF WEATHER PHENOMENON DETECTION USING MULTIPLE BEAMS." The entirety of U.S. application Ser. No. 13/781,449 is hereby incorporated by reference.

BACKGROUND

The present invention relates generally to the field of radar and other radio frequency (RF), microwave and millimeter wave frequency sensor systems. More specifically, the present invention relates generally to an electronically scanned array (ESA) radar system, such as an active electronically scanned array (AESA) radar system.

AESAs may generally include multi-chip modules for control of the AESA but may be very complex and have a high chip count. For example, the multi-chip module may include various components such as controller chips, analog chip, transmit/receive switches and modules, power amplifiers, low noise amplifiers, local beam control, etc. Each component may be optimized for performance, but it may be labor intensive, high cost, and require significant calibration. In addition, rapid beam movement in ESA systems requires high data bandwidths to each individually controlled element. This high speed data bandwidth either limits the available beam to beam switching speeds or forces a complex very high speed data path to be available to ESA elements from a centralized beam control element at an appreciable cost. Distributed control and memory to minimizes data speeds and thus cost. Further, such a module may require extra maintenance, which may be an issue since an aircraft generally has to fly on a schedule, and limiting dispatchability or availability of the aircraft may be costly in a commercial airline setting. What is needed is a system and/or method that provides a lower cost operation of an AESA.

It would be desirable to provide a system and/or method that provides one or more of these or other advantageous features. Other features and advantages will be made apparent from the present specification. The teachings disclosed extend to those embodiments that fall within the scope of the appended claims, regardless of whether they accomplish one or more of the aforementioned needs.

SUMMARY

One embodiment of the disclosure relates to a multi-chip module (MCM) including a set of one or more first semiconductor components and a plurality of second semiconductor components. The first semiconductor component set is coupled to the plurality of second semiconductor components, and the first semiconductor component set is configured to control the plurality of second semiconductor components. Each of the plurality of second semiconductor components is accessible through a plurality of data strings providing communication between the first semiconductor component set and the plurality of second semiconductor components, each data string defining a unique path between the first semiconductor component set and the plurality of second semiconductor components, such that the plurality of data strings provide redundant data paths between the first semiconductor component set and the plurality of second semiconductor components.

Another embodiment relates to a subassembly for an electronically scanned array including an antenna aperture layer configured to selectively emit and receive radio waves, a radio frequency (RF) ground layer, a radio frequency integrated circuit (RFIC) multi-chip module (MCM) attach layer, and a thermal layer. The RFIC MCM attach layer has attached thereto a plurality of MCMs, each MCM including a set of one or more first semiconductor components and a plurality of second semiconductor components controlled by the first semiconductor component set. The thermal layer is configured to draw heat away from at least one of the first semiconductor component set and the second semiconductor components.

Another embodiment relates to an electronically scanned array including a master controller and a plurality of multi-chip transmit/receive modules. Each transmit/receive module includes a set of one or more first semiconductor components and a plurality of second semiconductor components. The first semiconductor component set is coupled to the plurality of second semiconductor components, and the first semiconductor component set is configured to control the plurality of second semiconductor components. Each of the plurality of second semiconductor components is accessible through a first plurality of data strings providing communication between the first semiconductor component set and the plurality of second semiconductor components, each data string of the first plurality of data strings defining a unique path between the first semiconductor component set and the plurality of second semiconductor components, such that the first plurality of data strings provide redundant data paths between the first semiconductor component set and the plurality of second semiconductor components. Each of the transmit/receive modules is accessible by the master controller through a second plurality of data strings providing communication between the master controller and the plurality of transmit/receive modules, each data string of the second plurality of data strings defining a unique path between the master controller and the plurality of transmit/receive modules, such that the second plurality of data strings provide redundant data paths between the master controller and the plurality of transmit/receive modules.

Another embodiment relates to a multi-chip module (MCM) that includes multiple semiconductor components. Functional allocation of the requirements for the ESA is distributed optimally across these multiple components taking advantage of individual technologies. These allocated functional requirements include, but are not limited to, RF transmit and receive functions, distributed beam coefficient memory, distributed control elements, distributed computation elements, localized power supply for all of the MCM semiconductor components and thermal management. A first RFIC (radio frequency integrated circuit) semiconductor and distributed power supply can be controlled by a distributed computer semiconductor. The distributed computer offers the advantage of sharing the computational burden of a high beam switching rate system across multiple processors within the ESA system and also reducing digital bus electromagnetic interference (EMI). The first RFIC component and a plurality of secondary RIFC semiconductor components make up the ESA's RF transmit/receive module. The first RFIC semiconductor component can be coupled to the plurality of secondary RFIC semiconductor components. The first RFIC semiconductor component is configured to control the plurality of secondary RFIC semiconductor components. Each of the plurality of RFIC semiconductor components within the MCM is accessible through a plurality of data strings providing communication between the multiple semiconductor components. Each data string defines a unique path between the multiple semiconductor components and data string bus redundancy is provided to improve reliability, availability and dispatchability of the ESA system. Both high speed beam selection and redundancy are optimized by the distributed nature of beam control.

Another embodiment of the present disclosure relates to a subassembly for an electronically scanned array MCM. The MCM subassembly includes a sub-aperture layer configured to selectively emit and receive radio waves. The subassembly further includes a radio frequency (RF) ground layer. The subassembly further includes a radio frequency integrated circuit (RFIC) die or package attach layer, wherein the RFIC layer comprises a plurality of semiconductor components, Yet another embodiment of the present disclosure relates to the use of the MCM within an electronically scanned array. The electronically scanned array includes a plurality of MCM transmit/receive modules. Each of the plurality of second semiconductor components within the MCM is accessible through a plurality of data strings providing communication between the semiconductor components with each data string defining a unique path between the semiconductor components

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Before describing in detail the particular improved system and method, it should be observed that the invention includes, but is not limited to a novel structural combination of conventional data/signal processing components and sensing circuits, and not to the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring generally to the figures, a multi-chip module (MCM) is shown and described that may be used in radar and communications systems utilizing electronically scanned arrays (ESA).

Semiconductor components within the MCM may be coupled via a plurality of data strings that provide communications between the semiconductor components. Each data string may define a unique path between the semiconductor components. In one embodiment, each of the secondary semiconductor components may be part of at least three data strings. Further, in some embodiments, each secondary semiconductor component may be the first device in only one of the data strings.

In one embodiment, the MCM may include radio frequency integrated circuits (RFIC) as part of the subassembly. The subassembly may further include an aperture (antenna element) layer configured to selectively emit and receive radio waves, a radio frequency (RF) ground layer, and a thermal management layer. The thermal management layer may be configured to remove heat from the various semiconductor components of the MCM. The thermal management layer can be either active or passive in nature. In some embodiments, the thermal management layer may include heat sinks, fins, thermal spreading devices or substances (e.g., using high thermal conductivity layers), microfluidic cooling (e.g., two phase microfluidic cooling), etc.

The MCM as described in the present disclosure may be used to provide for an independently steered multi-beam active ESA at a lower cost, higher effective isotropic radiated power (EIRP), and a lower noise system. The ESA may feature a higher beam switching rate and a lower beam switching latency, improving performance (e.g., by being able in the ESA to switch faster and without pausing and without excessive buffering time), and an optimized cost and performance trade-off. In addition, distributed computer control and judicious control line redundancy improves the reliability, availability, and dispatchability of the ESA system. The MCM may have a low unit cost per area taken up by the components, may have a high circuit density per area, and may work with RF, analog, and digital circuits within a common RFIC. According to an exemplary embodiment, the chip count in the MCM is minimized by using a mixed signal silicon germanium (SiGe) TR RFIC module. Such a module may act as a master controller for a plurality of other chips (e.g., other chips coupled to the module such as gallium arsenide (GaAs) chips, gallium nitride (GaN) chips, etc.). The other chips may be simplified.

In one embodiment, the MCM and ESA as described herein may be used as part of any ESA system that requires rapid beam changes, pulse to pulse beam control, or radar sample to sample beam control. One such radar is described in greater detail with reference to U.S. application Ser. No. 13/781,449, titled "SYSTEM FOR AND METHOD OF WEATHER PHENOMENON DETECTION USING MULTIPLE BEAMS," which is assigned to the assignee of the present application and incorporated by reference herein.

According to some embodiments, a multi-chip module (MCM)/assembly that optimizes the cost and performance trade for electronically scanned arrays (ESA) for use in radar, and communication, navigation and surveillance systems (CNS), including Satcom, is provided. The MCM includes multiple semiconductor chip components. Functional allocation of the requirements for the ESA may be distributed optimally across these multiple chip components taking advantage of individual technologies. These allocated functional requirements include, but are not limited to, RF transmit and receive functions, distributed beam coefficient memory, distributed control elements, distributed computation elements, localized power supply for all of the MCM semiconductor components and thermal management. A first RFIC (radio frequency integrated circuit) semiconductor and distributed power supply can be controlled by a distributed computer semiconductor. The distributed computer offers the advantage of sharing the computational burden of a high beam switching rate system across multiple processors within the ESA system and also reducing digital line electromagnetic interference (EMI). The first RFIC component and a plurality of secondary RIFC semiconductor components make up the ESA's RF transmit/receive module. The first RFIC semiconductor component can be coupled to the plurality of secondary RFIC semiconductor components. The first RFIC semiconductor component is configured to control the plurality of secondary RFIC semiconductor components. Each of the plurality of RFIC semiconductor components within the MCM is accessible through a plurality of data strings providing communication between multiple semiconductor components Each data string defines a unique path between the semiconductor components and data string bus redundancy is provided to improve reliability, availability, and dispatchability of the ESA system. Both high speed beam selection and redundancy are optimized by the distributed nature of beam control.

Figure 1:
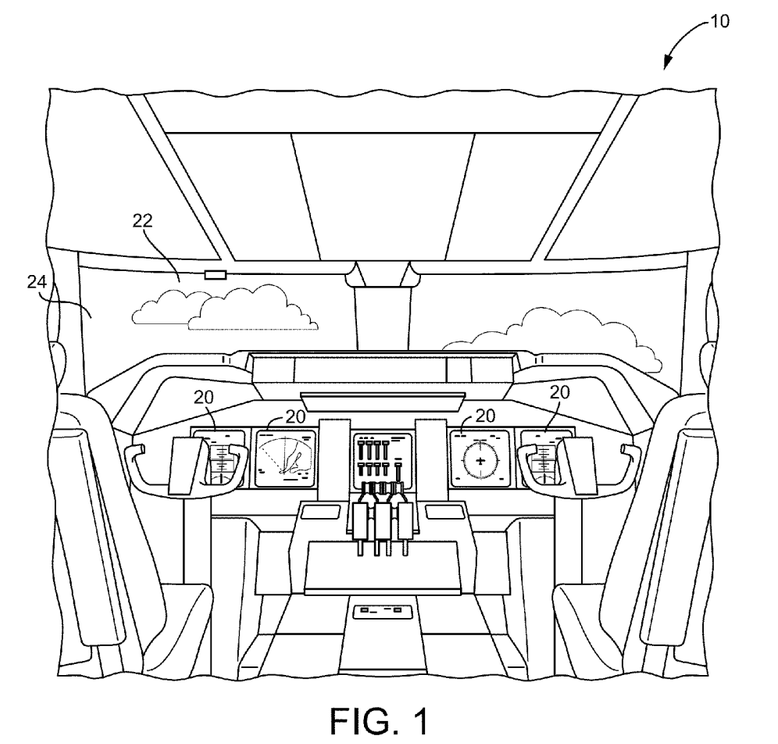
FIG. 1 is an illustration of an aircraft control center of an aircraft, according to an exemplary embodiment.

Referring to FIG. 1, an illustration of an aircraft control center or cockpit 10 is shown, according to one exemplary embodiment. Aircraft control center 10 includes at least one flight display 20. The pilot may use flight display 20 to increase visual range and to enhance decision-making abilities. In an exemplary embodiment, flight display 20 may be configured to show weather, terrain, fixed obstacles, variable obstacles (e.g., other aircraft), flight characteristics (e.g., altitude or speed), or any combination thereof.

Figure 2:
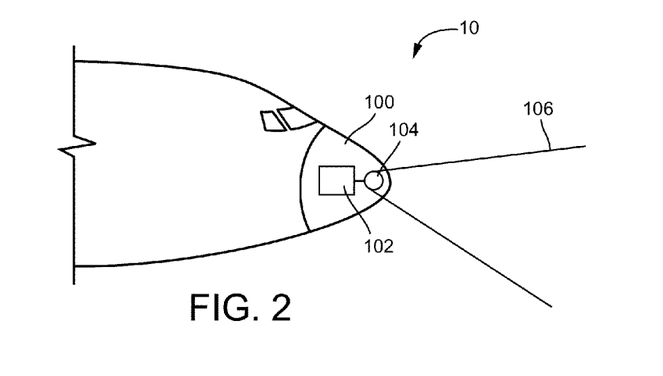
FIG. 2 is an illustration of a front of an aircraft including a radar system, according to an exemplary embodiment.

In FIG. 2, the front of an aircraft is shown with aircraft control center 10 and nose 100, according to an exemplary embodiment. A radar system 102 is generally located inside nose 100 of the aircraft. According to other exemplary embodiments, radar system 102 may be located at the top of the aircraft or on the tail of the aircraft. In an exemplary embodiment, radar system 102 can be a weather radar system that is adapted to use a multiplexed beam pattern in a radar scan 106 to sense weather phenomena such as wind shear. Radar scan 106 can scan 30 degrees in azimuth per second in one embodiment. While FIGS. 1-2 specifically refer to an aircraft, radar system 102 may be implemented on any stationary or mobile platform.

Advantageously, system 102 can be utilized to sense a variety of weather phenomenon, including wind shear and other hazards using an antenna 104. Radar antenna 104 may be an active electronically scanned array (AESA) antenna or active phase antenna. Antenna 104 may include an array of individual steerable elements. The elements may be solid state transmit/receive modules. The modules may provide signals at different frequencies or with different coding. Beams may be aimed from the AESA antenna by emitting separate radio waves from each module that interfere constructively at certain angles in front of antenna 104. Antenna 104 may be steered by using phase shift, or True Time Delay for Ultra-broad Band systems. In one embodiment, antenna 104 may include or be used with two or more receivers.

Figure 3:
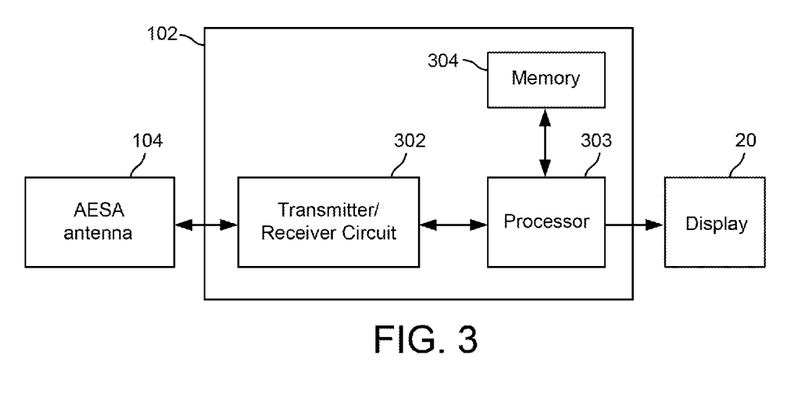
FIG. 3 is a block diagram of the radar system of FIG. 2, according to an exemplary embodiment.

Referring to FIG. 3, according to an exemplary embodiment, radar system 102 includes a processor 303, a memory 304, and a receiver/exciter circuit 302. Radar system 102 may further be connected to an AESA antenna 104 and display 20. In one embodiment, processor 303 controls AESA antenna 104 to provide multiplexed pulses using AESA antenna 104 configured as a selectable subaperture antenna. Although system 102 is discussed below as an avionic radar system, system 102 may also by a ground-based, space-based, or naval-based radar system. For example, system 102 may be or include a sense and avoid (S&A) or ground moving target indicator (GMTI) radar, a search and rescue radar, a "brown out" radar, a multimode signal intelligence radar, an electronic warfare radar, a border surveillance radar, a maritime radar, a fire control radar, a millimeter wave (MMW) imaging and landing radar, used in a high data rate system (a system that may provide radar images in real-time video data format), or otherwise. As another example, the MCM and ESA as described may be used in a hybrid frequency modulated continuous wave (FMCW)/pulsed radar system.

Referring generally to FIGS. 4-10, various illustrations of a multi-chip module architecture are shown. The multi-chip modules may be implemented in AESA antenna 104. AESA antenna 104 may generally include a RFIC MCM layer that includes the one or more MCMs. Each MCM may include a first semiconductor component that acts as a master controller and two or more (e.g., many) second semiconductor components connected to the first semiconductor component. Only the RFIC chips are shown for clarity, but power supply and distributed computer chips can reside within the MCM as well.

The semiconductor component that acts as a master controller may be a silicon germanium (SiGe) RFIC transmit/receive (T/R) module chip, and the other semiconductor components may be gallium arsenic (GaAs) chips, according to one embodiment. The SiGe T/R module can contain any or all of the following functions: limiter T/R switching, Low Noise Amplifiers (LNA), Power Amplifier (PA), variable gain reviewer and exciter amplification, attenuator phase shift (or time delay), temperature sensing, power detection, phase detection, distributed computing and memory, power supply, etc. Additionally, the SiGe T/R module may be configured to provide bias and control of "slaved" RFICs that are incorporated to improve systems performance. Silicon germanium is a high volume, low cost, mixed signal digital analog RF material. Silicon germanium may be used because of a high circuit density (low cost per square millimeter). A SiGe chip may be configured to control more than, for example, a GaAs chip or a gallium nitride (GaN) chip. The use of the SiGe chip may provide a high beam switching rate per dollar and low beam latency per dollar (e.g., optimizing the cost performance traits of the chip in the MCM and ESA). By using the SiGe chip, the number of control lines that are in communication with the other chips and components within the MCM may be reduced (e.g., control lines within the T/R module, between T/R modules, between the T/R module and the beam controller, between the T/R module and the power supply, etc.). Further, the use of the SiGe chip may allow for localized storage of data. Therefore, the computational burden to drive the beams of the antenna (e.g., independent beam selection) is distributed using multiplexed and localized functional control. Further, a self-calibration and self-testing process may be built into the chip. The distributed digital control architecture may provide for intra-chip redundancy, which improves reliability of the MCM, which in turn improves the reliability, availability and dispatchibility of the ESA system.

In the present embodiment, the distributed nature of the power amplifiers (PA) and low noise amplifier (LNA) spread across the entire radiation aperture allows for more degrees of freedom for thermal management. In other words, the heat generated by the PA and LNA chips may be distributed across the entire array face of the MCM instead of being localized at a point source, which may help with thermal management problems of the MCM. In addition, an embedded thermal management layer may further facilitate the transport of the flux away from the MCMs to a separate heat sink.

SiGe RFIC technology may allow the use of multiple, electronically independently steered beams at different frequencies in the radar or communication system. Since the various semiconductor components coupled to the SiGe chip can be channelized, the multiple beams may be independently steered as the chips are in parallel with high isolation. The MCMs utilizing the SiGe RFIC technology may have a multi channel PA RFIC or a multi channel LNA RFIC. In some embodiments, dual (or more) polarizations for a given frequency band may be provided (e.g., polarimetric radar).

In one embodiment (shown generally in FIGS. 4-7), a MCM may include a SiGe T/R module driving four other chips. The SiGe T/R module may be configured to drive a PA, a LNA, and a T/R switch. In other embodiments, the SiGe T/R module may be configured to drive various permutations of chips (e.g., multi channel PA, multi channel LNA, multi channel T/R switch, multi channel SiGe T/R module, etc.) without departing from the scope of the present disclosure. In other words, the SiGe T/R module may drive GaAs, GaN, or InP chips, or any combination thereof, depending on the performance and cost tradeoffs one wishes to make. In one embodiment, GaAs may be used for power generation and LNA purposes. GaNs may be used for improved power efficiency. InPs may be used for very high frequency millimeter waves. In some embodiments, receiver noise may be improved by utilizing chip level GaAs LNA stages for each multi-channel SiGe T/R RFIC.

In various embodiments, flip chip, wire bond, and/or other die attachment techniques may be utilized for the PA and/or LNA purposes.

Referring generally to FIGS. 4A-F, examples of MCM architectures are shown, according to exemplary embodiments. Each configuration 400, 410, 420, 430, 440, 450 is shown to include a primary semiconductor component 406. Component 406 is shown as a 4 channel SiGe T/R RFIC, configured to connect with up to four semiconductor components. Each MCM configuration 400-450 is shown to include a MCM perimeter 402 defining the area occupied by the MCM.

Figure 4A:
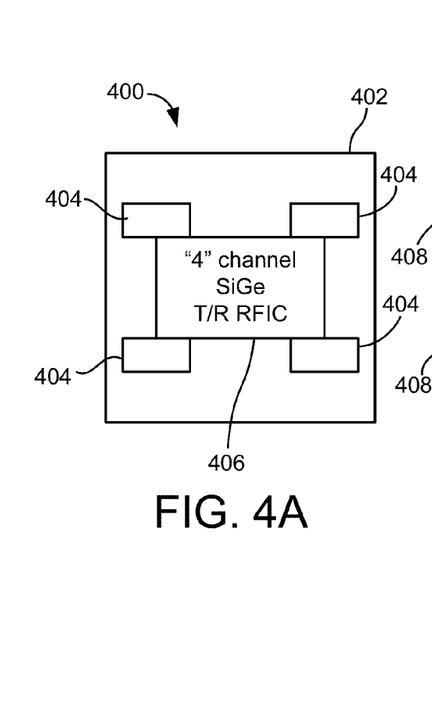
FIGS. 4A-F are schematic illustrations of multi-chip module configurations, according to exemplary embodiments.
Figure 4B:
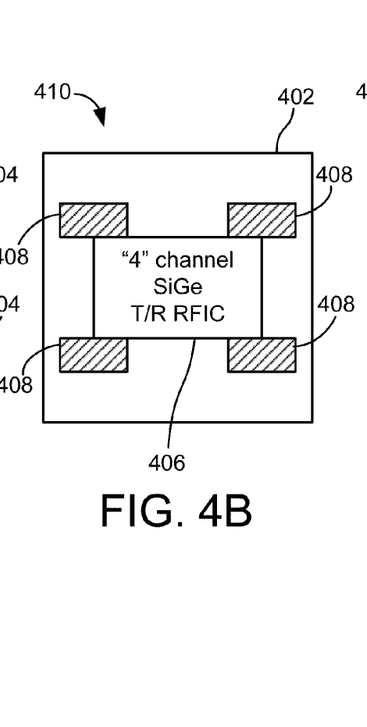
Figure 4C:
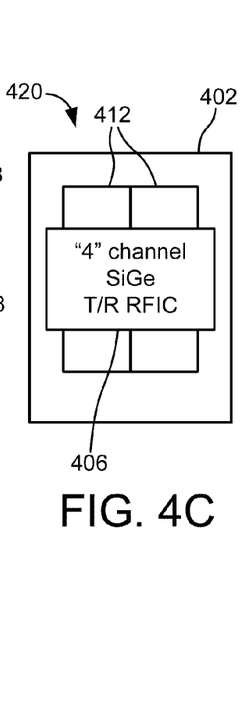
Figure 4D:
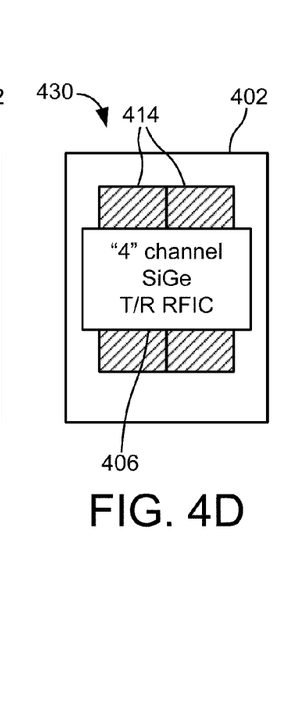
Figure 4E:
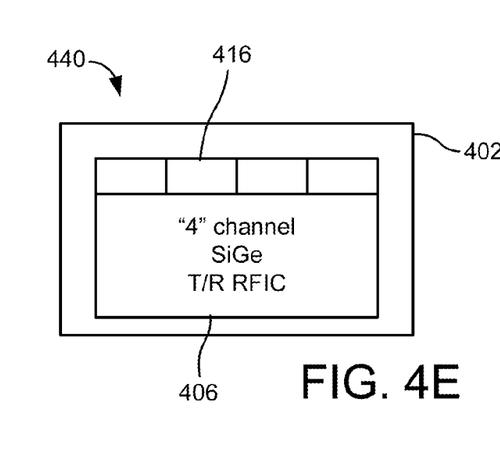
Figure 4F:
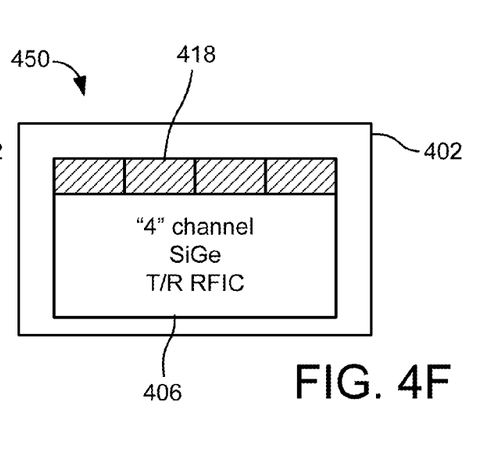

In the embodiments of FIGS. 4A-F, various MCM architectures are shown that illustrate how the companion chips to the SiGe chip may be partitioned in the MCM. In the embodiment of FIG. 4A, component 406 is shown connected to four LNA chips 404. In the embodiment of FIG. 4B, component 406 is shown connected to four PA chips 408. In the embodiment of FIG. 4C, component 406 is shown connected to two two-channel LNA chips 412. In the embodiment of FIG. 4D, component 406 is shown connected to two two-channel PA chips 414. In the embodiment of FIG. 4E, component 406 is shown connected to a four-channel LNA chip 416. In the embodiment of FIG. 4F, component 406 is shown connected to a four-channel PA chip 418.

The embodiments of FIGS. 4A-F illustrate a 4-channel SiGe RFIC chip. In other embodiments, any number of channels may be used. For example, in one embodiment, an 8-channel SiGe RFIC chip may be used and up to eight chips may be connected to component 406.

In various embodiments, any combination of chips may be used in the MCM. For example, instead of four LNA chips 404 or four PA chips 408 as illustrated in FIGS. 4A-B, a MCM may include one LNA chip, one PA chip, one T/R RFIC, and a limiter, or any other type or combination of chips. For example, chips 404, 408, 412, 414 may each be a T/R switch, a directional coupler, a PIN diode limiter, a PA, a LNA, etc. The chips may be GaAs chips, GaN chips, InP chips, or otherwise. In other words, the MCM as described in the present disclosure may be very flexible such that any type of component may be used in conjunction with the SiGe RFIC chip for ESA operation.

In one embodiment, a relationship between the number of channels of a first semiconductor (the SiGe RFIC chip) and the plurality of secondary semiconductor components may be maintained. For example, the SiGe RFIC chip may be an $\alpha$-channel T/R RFIC, where $\alpha$ is an integer. There may be $\beta$ $\lambda$-channel second semiconductor components, where $\beta$, $\lambda$ are integers. Thus, there may be a relationship between $\alpha$, $\beta$, $\lambda$ such that $\beta \times \lambda = \alpha$. For example, referring to FIG. 4C, two two-channel components ($\beta$, the number of second components is 2 and $\lambda$, the number of channels in each component is 2) are shown connected to a four channel ($\alpha=4$) SiGe T/R RFIC.

Figure 5:
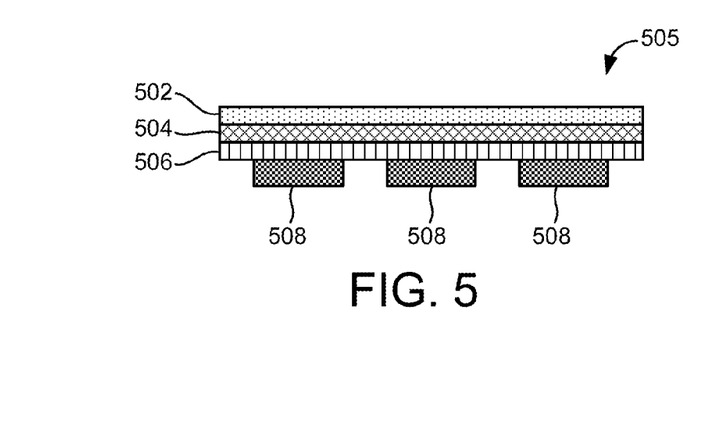
FIG. 5 is a schematic illustration an illustration of a subassembly for an electronically scanned array, according to an exemplary embodiment.
Figure 6A:
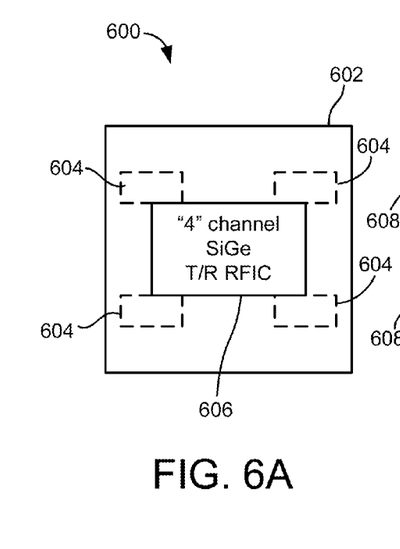
FIGS. 6A-D are schematic illustrations of multi-chip module configurations, according to other exemplary embodiments.
Figure 6B:
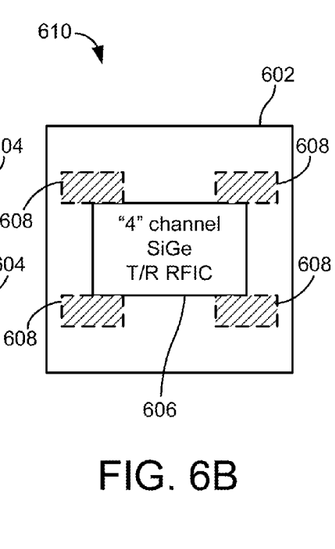
Figure 6C:
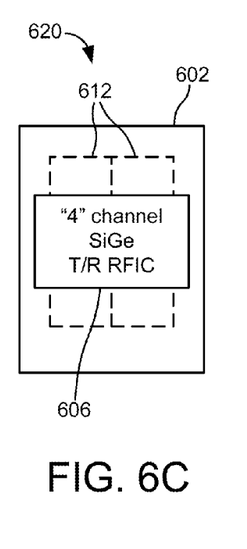
Figure 6D:
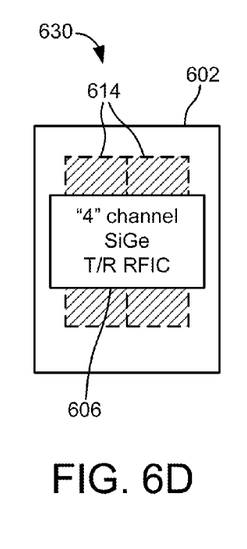

In some implementations, one or more MCMs as described above according to exemplary embodiments may be utilized in an ESA antenna architecture or subassembly. Referring to FIG. 5, an ESA antenna 104 architecture (shown as assembly 505) is shown in greater detail. Assembly 505 generally includes an aperture (antenna element) layer 502, an underground or RF ground layer 504, and a thermal layer 506, in addition to a RFIC MCM layer including multiple MCMs 508. MCMs 508 may be a combination of MCMs as generally described with reference to FIGS. 4A-F. Thermal layer 506 may be configured to provide thermal management to MCMs 508 (to cool the chips in MCMs 508). Each MCM 508 has an internal thermal management layer that connects to the greater thermal layer 506 of assembly 505 for a continuous thermal conduction path to the system heat sink.

Referring now to FIGS. 6A-D and 7, further MCM architectures 600, 610, 620, 630 are shown that illustrate how companion chips to the SiGe chip may be partitioned in the MCM. Only the RFIC chips are shown for clarity, but power supply and distributed computer chips can reside within the MCM as well. Because of element to element spacing in the radiation aperture of the ESA, there may be an issue where the array lattice (the framework of the ESA antenna architecture 700) is too tight to allow multiple MCMs to fit. Therefore, in the embodiment of architecture 700 of FIG. 7, MCMs 708 are shown both on top of the aperture (e.g., above aperture layer 702) and on the bottom of the aperture (e.g., below thermal layer 706). Further, thermal layer 706 may be placed in various areas to provide a thermal path connection to the thermal management layers within each MCM 708 located throughout architecture 700. Such an architecture may solve a compaction problem if space in the ESA is limited.

In some embodiments, the subassembly may include an RF feed manifold layer (e.g., an n-way RF combiner/splitter). In transmit, the n-way combiner splits the common input signal to feed each MCM. In receive, each signal coming from the MCM may be summed together through the manifold layer. The RF manifold layer is not illustrated in FIGS. 5 and 7 for clarity.

Figure 7:
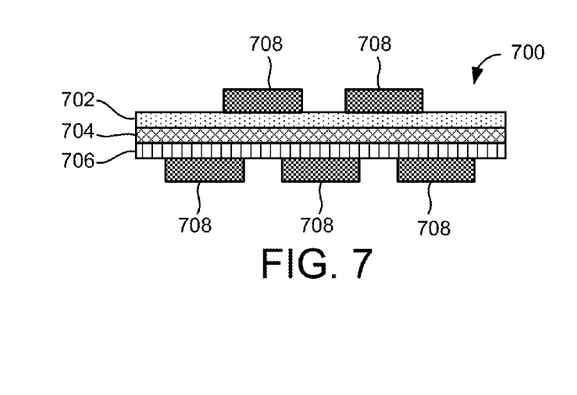
FIG. 7 is a schematic illustration of a subassembly for an electronically scanned array, according to another exemplary embodiment.

In some embodiments, the MCMs (e.g., "top side" and/or "bottom side" MCMs 508 and 708) may be "complete" MCMs that contain all functions. In some embodiments, the MCMs may be functionally segmented MCMs, in which components to perform some functions are provided in some MCMs and components to perform other functions are provided in other MCMs.

Referring again to FIGS. 6A-D, MCMs 600, 610, 620, 630 are shown with various structures. In MCM 600 of FIG. 6A, four LNA chips 604 are shown coupled to SiGe T/R RFIC chip 606. These LNA chips 604 may be packaged RFICs placed on the radiation layer of ESA antenna architecture 700, for example. Similarly, in MCM 610 of FIG. 6B, four PA chips 608 are shown coupled to SiGe T/R RFIC chip 606, and PA chips 608 are placed on the radiation layer. In MCM 620 of FIG. 6C, two two-channel LNA chips 612 are placed on the radiation layer, and in MCM 630 of FIG. 6D, two two-channel PA chips 614 are placed on the radiation layer.

Referring again generally to FIGS. 4-7, ESA radiating element spacing may be maintained in the ESA architecture. Such spacing may require a particular perimeter size for the MCMs in the ESA (e.g., perimeters 402, 602 as shown in FIGS. 4A-F and 6A-D). While perimeters 402, 602 are shown as rectangular, in other embodiments they may be shaped and spaced differently (e.g., they may be triangular in nature to offer more physical room for equivalent electrical performance). Further, such spacing may need to be maintained for MCM-to-MCM pitch along the ESA aperture. In one embodiment, the $1^{st}$ order lattice spacing of the radiating elements may be $\lambda/2 \times \lambda/2$ at the highest operating frequency of the ESA, where $\lambda$ is the wavelength at the operational frequency. For example, a four channel MCM may feed a 2×2 "subarray" of radiating elements. In various embodiments, the MCMs may or may not have a radiating element. The aperture may be a contiguous printed circuit board that the MCMs attach to, or each MCM may have its own "local" aperture. In some embodiments, each MCM may have its own radome superstrate within its own integrated radiation layer.

In the implementation shown in FIG. 5, the MCMs 508 are placed under the radiating element ground layer 504 to best minimize parasitic radiation. In the embodiment of FIG. 5, the ESA lattice spacing allows may be sufficient for MCMs 508. MCMs 508 are shown placed as single MCMs, which may be a desired implementation as long as the sizes of the chips are small enough. In another embodiment, the SiGe chip 406, LNA chips 404, PA chips 408, and other chips may be multichannel custom RFICs to optimize the chip layout and cost in architecture 500.

In the implementation shown in FIG. 7, MCMs 708 may be packaged separately and placed on the "hot" radiating side—with proper electromagnetic shielding provided for the MCM assembly—(e.g., above aperture layer 702) of the ESA. Further MCMs may be implemented in the aperture feed manifold layers of the ESA in some embodiments. It should be understood that the layouts illustrated in FIGS. 4-7 are illustrative only and other RFIC partitioning schemes may be used (e.g., different number of RFIC channels, different physical layout, different thermal management methods, packing schemes, etc.).

The partitioning described in FIGS. 4-7 may be applicable to various RFIC packaging and environment protection applications (e.g., for hermetic thermal coating of integrated circuits).

The embodiments of FIGS. 4-7 may allow a user to interconnect with various chips 404, 408, 412, 414, 604, 608, 612, 614 through the SiGe T/R RFIC chip 406 or 606. Each chip may need various lines for buses, positive voltages, negative voltages, and ground. For a whole ESA, there may be many elements, each with the various lines. By using SiGe chip 406 or 606 as a master controller, an input may be received by the controller and then provided to the various other chips.

The SiGe T/R RFIC module may be configured to provide bias control to the other chips (e.g., GaN, GaAs, etc.) connected to the module. Bias lines for the non-SiGe chips in the MCMs may reside within the SiGe T/R RFIC module only, instead of connecting back to the ESA power supply and the local distributed MCM computer, or the beam steering module of the aircraft. The SiGe T/R RFIC module controls the other chips in a slaved fashion, and the communications module of the aircraft may control the SiGe T/R RFIC module operation to control the operation of the other chips.

The SiGe T/R RFIC module may be configured to provide on-board calibration sensing and stimulus for the other chips. For example, temperature sensors, power monitoring sensors, phase detectors, etc. may be placed within the SiGe T/R RFIC module and other chips. As other examples, built in self testing (BIST) systems and self-calibration or self-healing systems may be included within the SiGe T/R RFIC module.

The SiGe T/R RFIC module may be configured to serve as a limiter controller, in conjunction with a PIN diode (or other) limiter, to "clamp" spurious RF energy unwanted by the system to the other GaAs/GaN chips connected to the module. The SiGe T/R RFIC module may have pre-bias circuitry to be used to facilitate a faster "turn-on" time of a PIN diode limiter, at a reduced time than would occur merely from the rectification of the alien RF energy to forward bias the PIN diode.

The SiGe T/R RFIC module may allow for local redundancy in the individual MCM. For example, when the SiGe T/R RFIC module communicates with other chips coupled to the master controller, there may be multiple paths of communication possible. If one particular connection has a problem, other paths may be used because of the various connections between the other chips and the SiGe T/R RFID module (the master controller).

In conjunction with ESA thermal layer 506, embedded thermal management may be included within the MCM. For example, a thermal spreader may be used that is interlaced between thermal layer 506 and MCMs 505 to provide a lateral spreading of heat away from the heat source. As another example, micro fluidic cooling may be used in both thermal layer 506 and within the thermal layer of the MCM 508. There may be liquid cooling at the MCM level that may occur right underneath a junction in the main semiconductor or master controller of the MCM. As another example, liquid metal cooling may be used to pull heat away by use of magnetic fields. As yet another example, a two-phased closed loop system may be used in which heat is absorbed in liquid. The liquid turns into gas and then turns back into liquid when pushed out to a heat sink. As yet another example, refrigerants may be used to cool components in the MCM. In some embodiments, thermal management connections may be provided between the MCM and ESA thermal layer 506 to provide thermal transfer between the MCM and ESA thermal layer 506.

As a result of the various embodiments described herein, thermal management of the ESA may occur on the board level, at the MCM level, or at the semiconductor die level. The thermal management at various layers of the ESA may help spread heat throughout the system.

Figure 8:
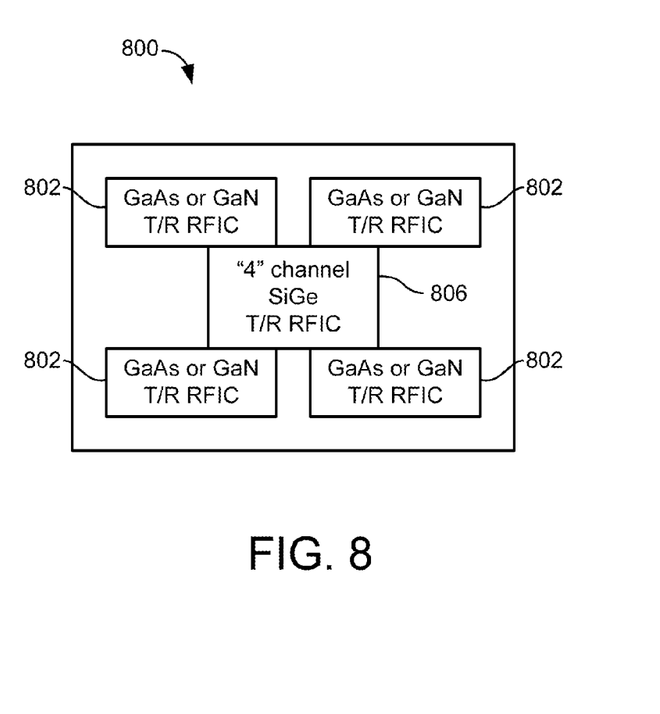
FIG. 8 is a schematic illustration of a multi-chip module configuration, according to an exemplary embodiment.

Referring now to FIG. 8, another multi chip module 800 configuration is shown. MCM 800 is shown to include a master controller 806, i.e., a 4 channel SiGe T/R RFIC. MCM 800 further includes four chips 802 coupled to master controller 806. Chips 802 may be GaAs or GaN T/R RFIC chips. In the embodiment of FIG. 8, chips 802 may be multi-function chips, including a power amplifier and low noise amplifier. Any MCM level power supply and distributed computer chips are not shown for clarity.

Figure 9:
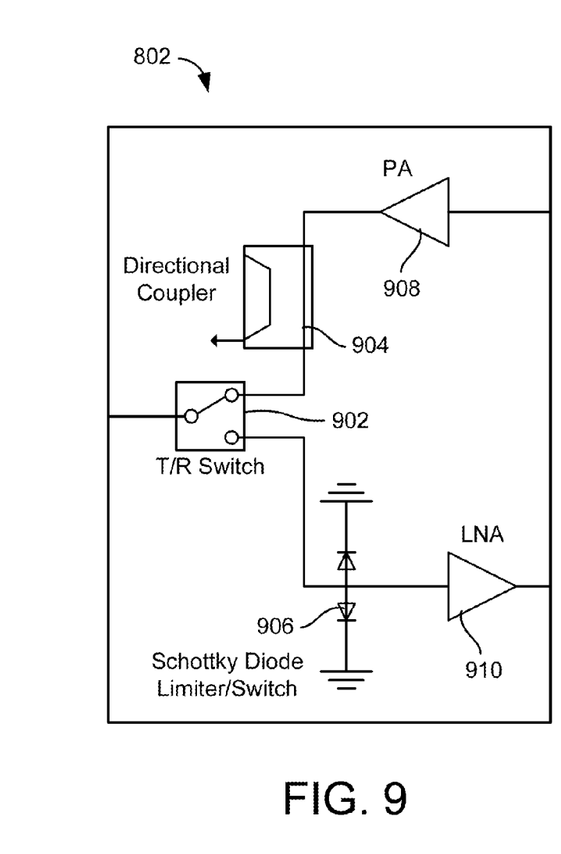
FIG. 9 is a circuit diagram of a transmit/receive chip of the multi-chip module of FIG. 8, according to an exemplary embodiment.

Referring to FIG. 9, chip 802 is shown in greater detail. Chip 802 includes a transmit/receive (T/R) switch 902 configured to alternate chip 802 between a transmit mode and receive mode. Chip 802 is shown to include a power amplifier (PA) 908 and low noise amplifier (LNA) 910. Directional coupler 904 may be included in chip 802 to sense a power output of PA 908. A limiter 906 (e.g., a Schottky diode limiter/switch as illustrated in FIG. 9) may be included in chip 802 to limit a power input to LNA 910. Chip 802 may be described as a multi-function T/R RFIC chip. Chip 802 may alternate between PA operation and LNA operation via switch 902.

Figure 10A:
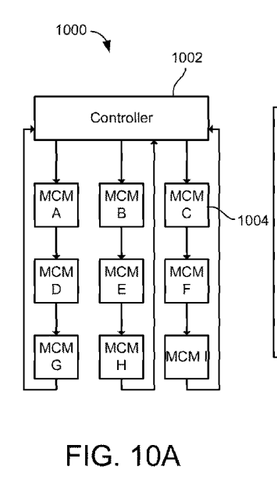
FIGS. 10A-C illustrate examples of an array communication signal arrangement of the electronically scanned array, according to an exemplary embodiment.
Figure 10B:
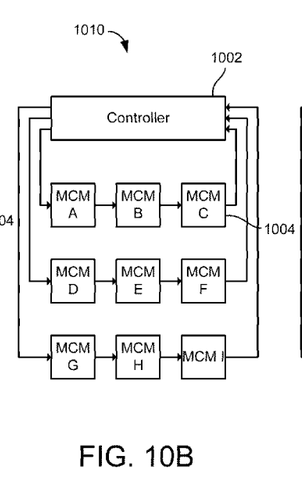
Figure 10C:
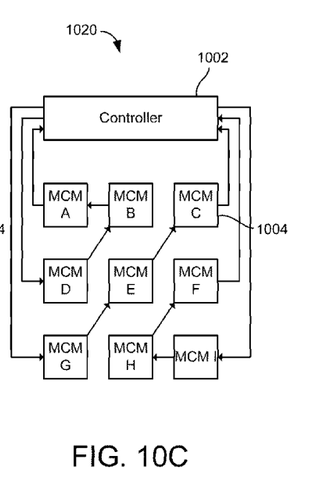

FIGS. 10A-C illustrate examples of an array communication signal arrangement within a subassembly, according to an exemplary embodiment. The array communication signal arrangement may be configured as three sets (1000, 1010, 1020) of overlapping daisy-chained serial data strings. In other words, the connections between the individual components 1004 shown in FIGS. 10A-C may be used to sustain redundancy within the subassembly as described above.

In the embodiment of FIGS. 10A-C, arrangements 1000, 1010, 1020 are shown to include a controller 1002 that serves as a master controller. In some embodiments, controller 1002 may be a beam steering controller or another controller of an ESA subassembly. Each component 1004 may be a separate component within the subassembly. In some embodiments, components 1004 may each represent a separate MCM or component of an MCM. For example, controller 1002 may be configured to communicate with distributed computation elements of each MCM to perform various functions of the subassembly, such as RF transmit and receive functions, distributed beam coefficient memory, distributed control elements, distributed computation elements, etc. Distributed computing may allow for increased reliability and/or performance (e.g., increased beam switching speed).

In some embodiments, several components 1004 may be connected to controller 1002 by at least three separate strings. For example, MCM C 1004 is shown as part of a first string with MCM F and MCM I in arrangement 1000; a second string with MCM A and MCM B in arrangement 1010; and a third string with MCM G, MCM E, and MCM C in arrangement 1020. Further, in some embodiments, no individual MCM may be the first device in a series in more than one string. For example, MCM C 1004 is shown as the first device in only one string, in FIG. 10A.

In the embodiments of FIGS. 10A-C, the three (or more) data strings that each component 1004 may be included in may improve redundancy and reliability of the subassembly. For example, if one component or data stream (e.g., MCM or distributed computation element) malfunctions, other components may still use other data strings to communicate with controller 1002. In some embodiments, each component may be the first device in only one string, so that a malfunctioning component has the least impact possible on the MCM.

In some embodiments, a similar redundant data bus structure may be utilized within a single MCM. For example, a MCM master device (e.g., a distributed computing element) may be connected to one or more semiconductor components (e.g., SiGe T/R RFIC chip) using several separate data strings. In some embodiments, the MCM master device may be connected to the slave semiconductor components directly or through another semiconductor component. In some embodiments, at least three data strings may be used to connect the slave semiconductor components to the master device. The multiple data strings connecting each slave device to the master device within the MCM allow semiconductor components of the MCM to continue communicating with the master device even if one of the components or data lines becomes damaged, providing increased redundancy and reliability within the MCM. In some embodiments, the slave devices may include monolithic microwave integrated circuits (MMICs).

In some embodiments, the MCMs and/or ESA subassemblies described herein may be configured to allow for control and/or data storage/memory distribution among a set of several components (e.g., several MCMs). The localized control and/or storage elements may be controlled by a master controller (e.g., beam steering computer) of the ESA. In some embodiments, such distribution allowing local control and/or local memory storage (e.g., at an MCM level) may allow for faster beam switching with the ESA. Beam control may be held in either a single large beam steer computer or in a hierarchical beam control set of elements. High beam update rates may be supported when needed by very fast communication. Some systems are configured to transmit a set of pulses at a given pointing angle before repositioning the beam to a new position or to split their available transmitter power between beams synthesized at the same time. This simultaneous multiple beam generation is useful if one has sufficient transmitter power and one is looking at point targets that are separable in either range or Doppler space. Such systems may not include fully distributed control of multiple beam coefficients.

In some embodiments, radar systems (e.g., weather radar systems) may utilize distributed control and/or storage of multiple beam coefficients, for example in multiple MCMs. Such systems may use pulse to pulse beam control to produce independent beams. Local storage of beam coefficients may provide for the ability to select beam sets across the entire array. In some embodiments, such local control and/or storage may be used in conjunction with a small antenna windshear control algorithm. In some embodiments, multiple beam positions may be employed during mid-flight. For example, beam patterns may be changed during an active transmit and/or active receive time.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, optically, including optical fiber, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A multi-chip module (MCM), comprising:
a first semiconductor component;
a plurality of second semiconductor components, wherein the first semiconductor component is coupled to the plurality of second semiconductor components, and wherein the first semiconductor component is configured to control the plurality of second semiconductor components;
wherein each of the plurality of second semiconductor components is accessible through a plurality of data paths providing communication defined by a plurality of data strings between the first semiconductor component and the plurality of second semiconductor components, each data string defining a unique path for the communication between the first semiconductor component and a unique subset of the plurality of second semiconductor components, such that the plurality of data strings define redundant data paths between the first semiconductor component and each of the plurality of second semiconductor components.

2. The multi-chip module of claim 1, wherein at least one of the first semiconductor component and the plurality of second semiconductor components comprise monolithic microwave integrated circuits (MMICs).

3. The multi-chip module of claim 1, wherein the first semiconductor component comprises at least one of silicon germanium (SiGe), gallium arsenide (GaAs), gallium nitride (GaN), and indium phosphide (InP).

4. The multi-chip module of claim 1,
wherein the first semiconductor component comprises an $\alpha$-channel transmit/receive radio frequency integrated circuit (RFIC), where $\alpha$ is an integer.

5. A multi-chip module (MCM), comprising:
a first set of one or more first semiconductor components;
a plurality of second semiconductor components, wherein the first set is coupled to the plurality of second semiconductor components, and wherein the first set is configured to control the plurality of second semiconductor components;
wherein each of the plurality of second semiconductor components is accessible through a plurality of data paths defined by a plurality of data strings for communication between the first set and the plurality of second semiconductor components, each data string defining a unique path between the first set and at least one of the plurality of second semiconductor components for the communication, such that the plurality of data strings define redundant data paths between the first set and each of the plurality of second semiconductor components, wherein the first set comprises an $\alpha$-channel transmit/receive radio frequency integrated circuit (RFIC), where $\alpha$ is an integer, wherein the plurality of second semiconductor components comprise:
$\beta$ $\gamma$-channel second semiconductor components, where $\beta \times \gamma = \alpha$, and $\alpha$, $\beta$, and $\gamma$ are integers.

6. The multi-chip module of claim 1, wherein each of the plurality of second semiconductor components comprises at least one of a power amplifier, a low noise amplifier, and a transmit/receive (T/R) RFIC.

7. The multi-chip module of claim 1, wherein at least one of the first semiconductor component and the second semiconductor components comprise a T/R RFIC, the T/R RFIC comprising at least one of a T/R switch, a direction coupler, a PIN diode limiter, a power amplifier, and a low noise amplifier.

8. The multi-chip module of claim 1, wherein the plurality of second semiconductor components comprise at least one of silicon germanium (SiGe), gallium arsenide (GaAs), gallium nitride (GaN), and indium phosphide (InP).

9. The multi-chip module of claim 1, wherein each of the plurality of second semiconductor components are accessible through at least three data strings.

10. The multi-chip module of claim 1, wherein each of the plurality of second semiconductor components is a first device in only one data string of the plurality of data strings.

11. A multi-chip module (MCM), comprising:
a first set of one or more first semiconductor components;
a plurality of second semiconductor components, wherein the first set is coupled to the plurality of second semiconductor components, and wherein the first set is configured to control the plurality of second semiconductor components;
wherein each of the plurality of second semiconductor components is accessible through a plurality of data paths defined by a plurality of data strings for communication between the first set and the plurality of second semiconductor components, each data string defining a unique path between the first set and at least one of the plurality of second semiconductor components for the communication, such that the plurality of data strings define redundant data paths between the first set and each of the plurality of second semiconductor components, wherein the MCM is one of a plurality of MCMs in an electronically scanned array.

12. The multi-chip module of claim 1, further comprising a thermal management layer configured to remove heat from one or more of the first semiconductor component and the plurality of second semiconductor components, wherein the thermal management layer comprises at least one of an active thermal management component and a passive thermal management component.

13. The multi-chip module of claim 1, wherein the first set of semiconductor component comprises a distributed computing component, wherein the distributed computing component is configured to communicate with a master controller, and wherein the master controller is configured to distribute one or more tasks across a plurality of multi-chip modules with which the master controller is connected.

14. The multi-chip module of claim 1, further comprising an on-chip power supply configured to supply power to the first semiconductor component and the plurality of second semiconductor components.

15. A subassembly for an electronically scanned array, comprising:
an antenna aperture layer configured to selectively emit and receive radio waves;
a radio frequency (RF) ground layer;
a radio frequency integrated circuit (RFIC) multi-chip module (MCM) attach layer, wherein the RFIC MCM attach layer has attached thereto a plurality of MCMs, each MCM comprising a first set of one or more first semiconductor components and a plurality of second semiconductor components controlled by the first set; and
a thermal layer configured to draw heat away from at least one of the first set and the second semiconductor components, wherein the each of the plurality of second semiconductor components is accessible through a plurality of data paths defined by a plurality of data strings providing communication between the first set and the plurality of second semiconductor components, each data string defining a unique path between the first set and at least one of the plurality of second semiconductor components.

16. The subassembly of claim 15, wherein the thermal layer comprises at least one of: a thermal spreader, micro fluidic cooling, liquid metal cooling, a two-phased closed loop, and a refrigerant.

17. The subassembly of claim 15, wherein the first set is coupled to the plurality of second semiconductor components, and wherein the first set is configured to control the plurality of second semiconductor components.

18. The subassembly of claim 17, wherein each unique data path comprises a unique subset of the second semiconductor components.

19. The subassembly of claim 15, wherein at least one of the first set and the plurality of second semiconductor components comprise a monolithic microwave integrated circuit (MMIC).

20. The subassembly of claim 15, wherein the first set and the plurality of second semiconductor components comprise at least one of silicon germanium (SiGe), gallium arsenide (GaAs), gallium nitride (GaN), and indium phosphide (InP).

21. The subassembly of claim 15, wherein the MCMs comprise one or more of processing components and data storage components, wherein the processing components and the data storage components are utilized by a master controller of the electronically scanned array to perform tasks of the electronically scanned array and are distributed across the plurality of MCMs.

22. The subassembly of claim 15, further comprising a plurality of data strings connecting each of the plurality of MCMs to a master controller of the electronically scanned array, such that the plurality of data strings provide redundant data paths between the master controller and the plurality of MCMs.

23. An electronically scanned array, comprising:
a master controller; and
a plurality of multi-chip transmit/receive modules, each transmit/receive module comprising:
a first set of one or more first semiconductor components; and
a plurality of second semiconductor components, wherein the first set is coupled to the plurality of second semiconductor components, and wherein the first set is configured to control the plurality of second semiconductor components;
wherein the each of the plurality of second semiconductor components is accessible through a first plurality of data paths providing communication between the first set and the plurality of second semiconductor components defined by a plurality of data strings, each data string of the first plurality of data strings defining a unique path between the first set and at least one of the plurality of second semiconductor components, such that the first plurality of data strings define redundant data paths between the first set and each of the plurality of second semiconductor components, and
wherein each of the transmit/receive modules is accessible by the master controller through a second plurality of data paths defined by a plurality of second data strings providing communication between the master controller and the plurality of transmit/receive modules, each data string of the second plurality of data strings defining a unique path between the master controller and at least one of the plurality of transmit/receive modules, such that the second plurality of data strings provide redundant data paths between the master controller and each of the plurality of transmit/receive modules, wherein the first set comprises an α-channel transmit/receive radio frequency integrated circuit (RFIC), and wherein the plurality of second semiconductor components comprise β γ-channel second semiconductor components, where $\beta \times \gamma = \alpha$, and $\alpha, \beta$, and $\gamma$ are integers.

24. The electronically scanned array of claim 23, wherein one or more of the first semiconductor components and the plurality of second semiconductor components comprise monolithic microwave integrated circuits (MMICs).

25. The electronically scanned array of claim 23, wherein the one or more of the first semiconductor components and the plurality of second semiconductor components comprise at least one of silicon germanium (SiGe), gallium arsenide (GaAs), gallium nitride (GaN), and indium phosphide (InP).

26. The electronically scanned array of claim 23, wherein each unique data path comprises a unique subset of the second semiconductor components.

27. The electronically scanned array of claim 23, wherein each of the plurality of second semiconductor components comprises at least one of a power amplifier, a low noise amplifier, and a transmit/receive (T/R) RFIC.

28. The electronically scanned array of claim 23, wherein at least one of the first semiconductor component and the second semiconductor component comprise a T/R RFIC, the T/R RFIC comprising at least one of a T/R switch, a directional coupler, a PIN diode limiter, a power amplifier, and a low noise amplifier.

29. The electronically scanned array of claim 23, wherein each of the plurality of second semiconductor components is accessible through at least three data strings.

30. An electronically scanned array, comprising:
a master controller; and
a plurality of multi-chip transmit/receive modules, each transmit/receive module comprising:
a first set of one or more first semiconductor components; and
a plurality of second semiconductor components, wherein the first set is coupled to the plurality of second semiconductor components, and wherein the first set is configured to control the plurality of second semiconductor components;
wherein the each of the plurality of second semiconductor components is accessible through a first plurality of data paths defined by a plurality of data strings for communication between the first set and the plurality of second semiconductor components, each data string of the first plurality of data strings defining a unique path between the first set and at least one of the plurality of second semiconductor components, such that the first plurality of data strings define redundant data paths between the first set and each of the plurality of second semiconductor components, and
wherein each of the transmit/receive modules is accessible by the master controller through a second plurality of data paths defined by a plurality of second data strings providing communication between the master controller and the plurality of transmit/receive modules, each data string of the second plurality of data strings defining a unique path between the master controller and the plurality of transmit/receive modules, such that the second plurality of data strings define redundant data paths between the master controller and the plurality of transmit/receive modules, wherein the first set comprises an α-channel transmit/receive radio frequency integrated circuit (RFIC), and wherein each of the plurality of second semiconductor components is a first device with respect to the first set in only one data path defined by the first plurality of data strings.

31. The electronically scanned array of claim 23, wherein the plurality of multi-chip transmit/receive modules comprise one or more of processing components and data storage components, wherein the processing components and the data storage components are utilized by a master controller to perform tasks of the electronically scanned array are distributed across the plurality of multi-chip transmit/receive modules.

32. The electronically scanned array of claim 23, wherein at least one of control elements and storage elements of a set of beam coefficients is distributed across two or more of the multi-chip transmit/receive modules.

* * * * *